UNITED STATES PATENT OFFICE.

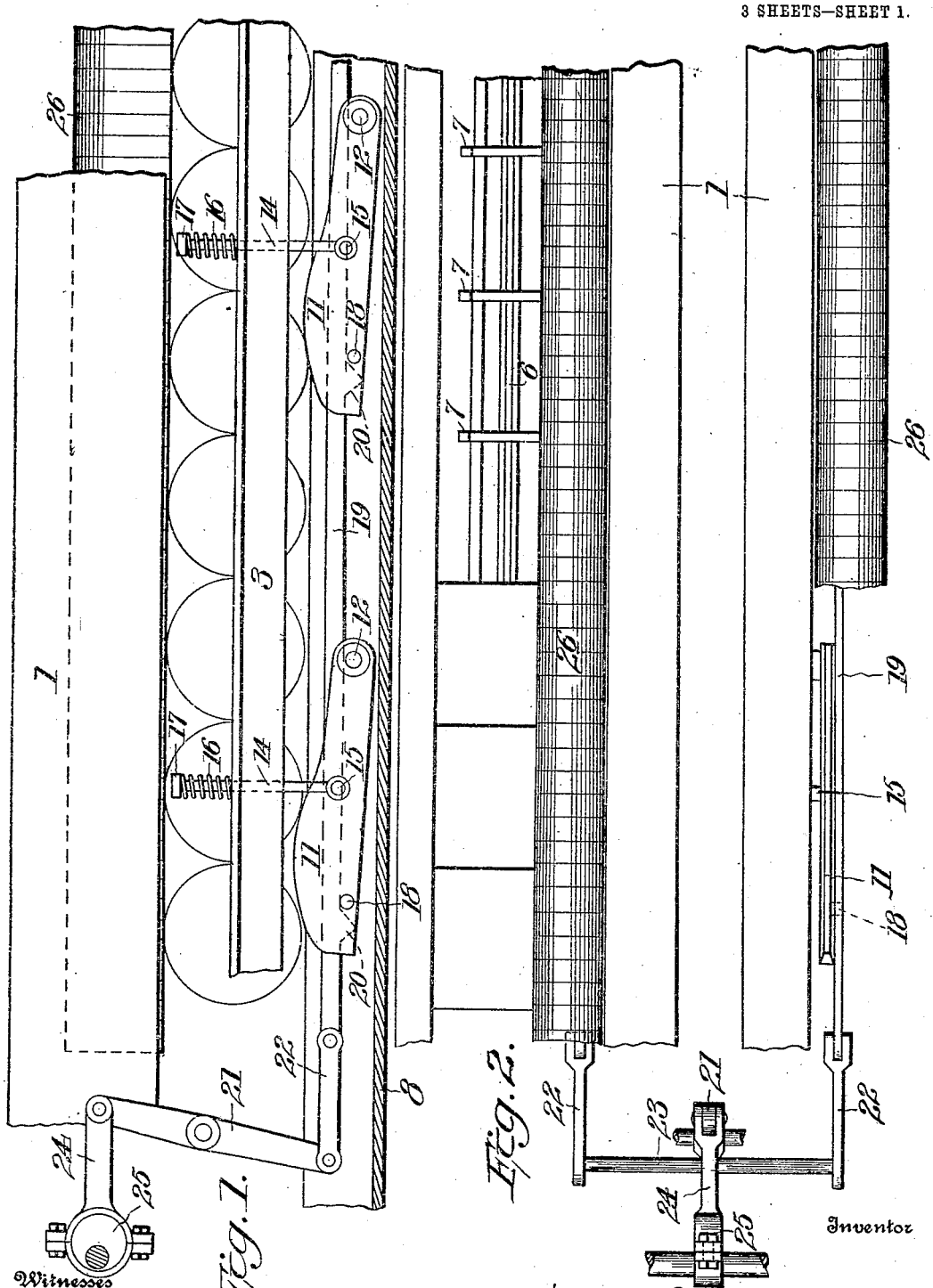

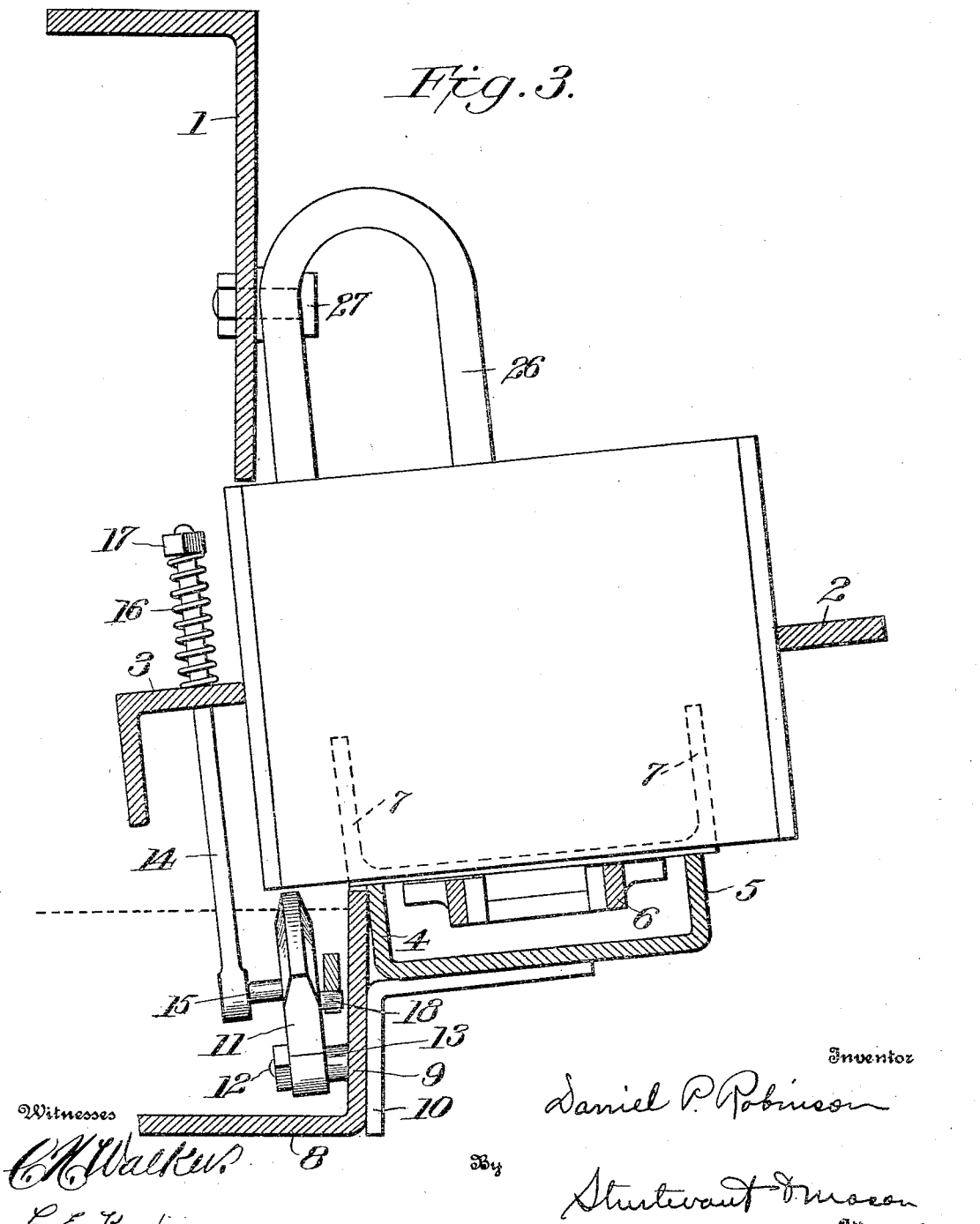

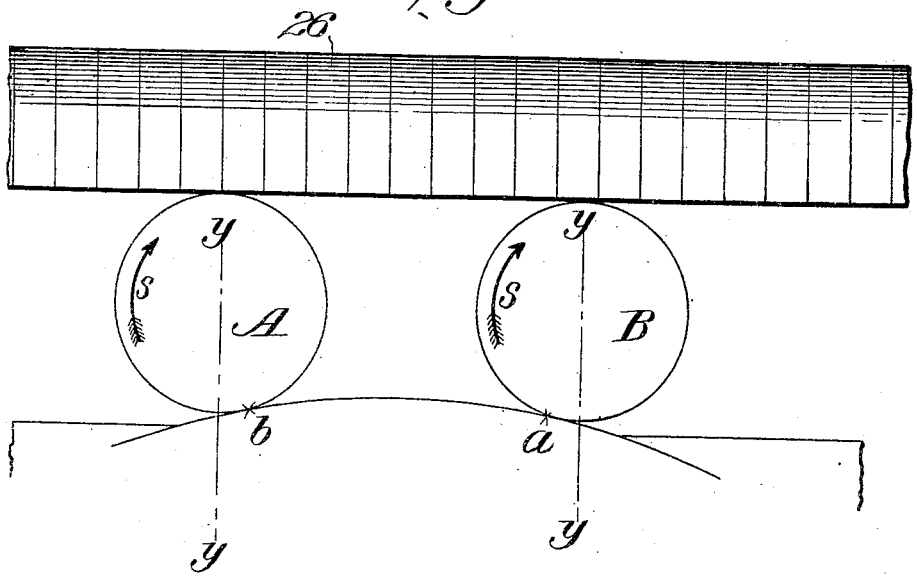
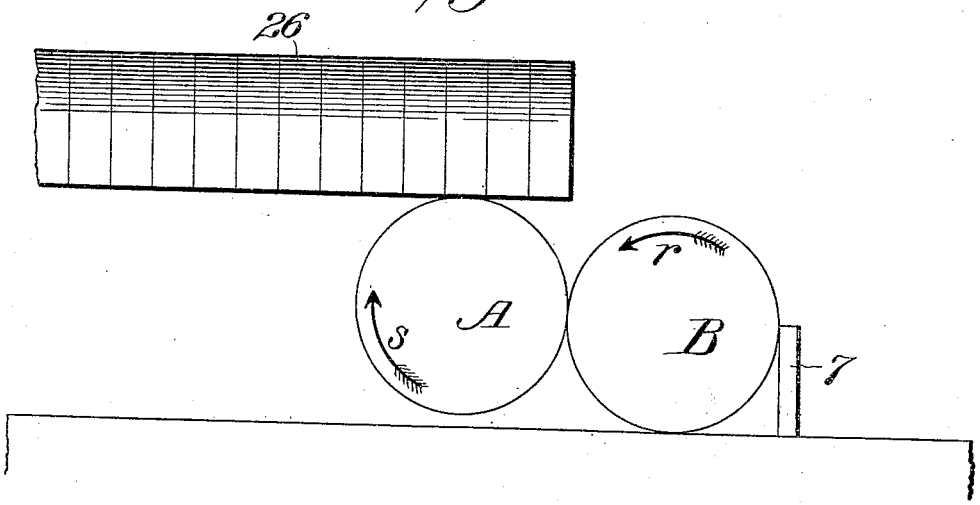

DANIEL P. ROBINSON, OF BALTIMORE, MARYLAND, ASSIGNOR TO CONTINENTAL CAN COMPANY, OF BALTIMORE, MARYLAND, A CORPORATION OF NEW JERSEY.

CAN-SOLDERING MACHINE.

962,978.          Specification of Letters Patent.    Patented June 28, 1910.

Application filed June 15, 1909. Serial No. 502,208.

*To all whom it may concern:*

Be it known that I, DANIEL P. ROBINSON, a citizen of the United States, residing at Baltimore, in the State of Maryland, have invented certain new and useful Improvements in Can-Soldering Machines, of which the following is a description, reference being had to the accompanying drawing and to the letters and figures of reference marked thereon.

The invention relates to new and useful improvements in can soldering machines, and more especially to can soldering machines of the type wherein solder is applied to the end seam of a can.

An object of the invention is to provide a soldering machine with soldering means which applies solder to the lower portion of the seam as the can is conveyed through the machine, and with means for rotating the can while in contact with the soldering means in a direction opposite to direction of rotation of the can in its bodily travel to the soldering means, whereby the seam of the can will be drawn across or given a sliding contact with the soldering means.

A further object of the invention is to provide a machine of the above character with a solder bath and with a soldering iron which is intermittently immersed in the solder bath for the purpose of charging the iron with solder.

A further object of the invention is to provide a machine of the above character with a magnet which contacts with the upper portion of the cans and causes the cans to rotate in a direction opposite to the direction of rotation in the bodily travel of the can, to the soldering means.

These and other objects will in part be obvious and will in part be hereinafter more fully described.

In the drawings which show by way of illustration one embodiment of the invention; Figure 1 is a vertical sectional view showing a portion of a soldering machine having my invention applied thereto. Fig. 2 is a top plan view of a portion of the machine with certain parts broken away for the sake of clearness. Fig. 3 is a transverse sectional view through one side of the machine. Fig. 4 is a detail view showing the cans as they come in contact with the magnet. Fig. 5 is a detail view showing the operation of the curved iron.

In the drawings I have shown a framework 1, on which is supported suitable side guiding rails 2 and 3. The can rolls normally on guiding rails 4, 5. These parts are of the usual construction and will not need further description.

As a means for rolling the cans on the supporting rails 4 and 5, I have herein shown a feed chain 6, which carries upwardly projecting arms 7, 7, which extend above the guide rails 4, 5, and will engage the cans and positively roll the same along the supporting rails.

It will be understood that any other suitable feeding mechanism may be substituted for that herein shown without departing in any way from the spirit of my invention, and I have shown a chain feed solely for the purpose of illustration. The essential feature of the feeding mechanism is a positive means for bodily conveying the cans through the soldering machine.

As a means for supplying the solder to the machine, I have herein shown a solder bath 8 which includes the usual bottom portion from which rise side members 9. This solder bath is arranged underneath the inner ends of the rotating cans. The guide rails 4, 5 at the soldering point are in the form of a channel member supported on a bracket 10, mounted on the side of the solder bath 8.

As is usual in this class of machines, a run way is formed for the cans on each side of the machine so that the cans are conveyed along one side of the machine where one end is soldered, and then conveyed along the other side of the machine, where the other end is soldered.

The solder bath preferably extends from one side of the machine to the other so as to provide a soldering means for the cans on both run ways. This arrangement of parts however, is not essential in my present invention, and may be varied if desired. Within the solder bath as herein illustrated, are located pivoted soldering irons 11. The iron 11, is supported on a pivot bolt 12 extending from a lug 13 on the side of the solder bath. The soldering iron extends to one side of the solder bath and the weight of the iron would normally tend to lower the same into the solder bath.

As a means for supporting the soldering iron so as to lift the soldering face of the iron above the bath and contact with the seam on the can, I have provided a rod 14, which is pivoted at 15 to the iron and extends upward through the guiding rails 3 where it is encircled by a spring 16, bearing against a nut 17 on the rod at one end, and against the rail at the other end. This spring 16 as above noted will hold the soldering iron normally raised slightly above the solder bath and in contact with the end seam of the can. In order that the iron may be charged with solder, said iron may be intermittently lowered entirely beneath the solder bath so that its soldering face will be charged with solder.

In the drawings I have shown two irons 11, although it will be understood that any number of irons may be used. Each of the irons is provided with a projecting stud 18. A sliding rod 19 carries a cam shoulder 20 which will engage the studs 18 as the rod is reciprocated and depress the soldering iron 11 against the action of the spring 16, so that its soldering face will be immersed in the bath of solder.

The rod 19 is preferably reciprocated by means of a lever 21. There will be of course, two reciprocating rods at each side of the machine when the parts are arranged as herein illustrated and to each of these rods is connected a link 22 which at its other end is pivoted to a cross bar 23 carried by the lower end of the lever 21. The lever 21 at its upper end is connected to an eccentric strap 24 coöperating with an eccentric 25 on the cross shaft of the machine. The eccentric 25 will vibrate the lever 21 which will in turn reciprocate the rods 19 and thus positively and intermittently immerse the soldering irons in the solder bath.

It will readily be seen that by the mechanism above described, the cans will be rolled along the supporting rails 3 and 4, and if the cans were allowed to move in this manner, they would merely roll over the soldering iron, and we would have a rolling contact between the can and the iron. It has been found in practice that it is impracticable to apply solder to a can by a rolling contact. In order to facilitate the applying of the solder to the cans, I have provided means whereby the can will be caused to rotate while in contact with the soldering mechanism in a direction opposite to the direction of rotation in its movement to the soldering mechanism.

As herein shown, I have provided a plurality of magnets 26 which are so connected as to form practically one long magnet which magnet is located directly above the path of movement of the cans through the soldering-machine. These magnets as shown in Fig. 3 are U-shaped and are secured to the framework 1 of the machine by a suitable securing bolt 27. The poles of the magnet are preferably spaced a distance above the guiding rails 4 and 5, slightly greater than the diameter of the can, as shown more clearly in Fig. 4. From this figure, it will be evident that as the cans are rolled along the rail 5, by the upwardly projecting arms 7, said cans will be rolling in the direction of the arrow $r$ until the can comes underneath the magnet 26 and is subjected to the lifting power of the magnet. The magnet will at once lift the can to the position shown at A in Fig. 4. In this position the can is clear of the rail 5 and is in contact with the magnets 26. As the projecting arm now forces the cans bodily through the machine, the can will roll on the magnet, and consequently will roll in the direction of the arrow $s$ or in a direction opposite to the direction of rotation of the can when rolling on the supporting rails. The soldering iron 11 which is spring pressed upward, will be lifted into contact wth the can as it rolls along the magnet and as the can is now rolling in the reverse direction instead of having a rolling contact with the iron, it will be drawn across the soldering face of the iron or give a sliding contact therewith. This sliding contact between the iron and the can, would tend to keep the iron clean and free from oxidation and will greatly increase the efficiency of the soldering contact.

The soldering iron as herein shown is an iron having a curved contacting face. I do not claim herein broadly this construction of soldering iron as the same forms the subject matter of my co-pending application Serial No. 494,825, filed May 8th, 1909. It will be understood also that while I have shown this particular form of iron and prefer to use the same, that this invention is in no wise limited to this form of iron as from certain aspects of the invention, any other form of soldering means may be used, the essential feature being that the can is rotated in a direction opposite to the bodily travel of the can, whereby the sliding soldering contact is secured. I find however, that the curved form of iron has the distinct advantage in connection with the means herein shown for rotating the can in a reverse direction as by this form of iron, I am able to increase the extent of contact upon the seam of the can of the iron for a given distance of travel. That is to say, the can when in the position B Fig. 5, will make contact with the iron 11 at the point $a$ which is located at the left hand of a vertical line $y, y$, passing centrally through the can. This is the point where the can makes initial contact with the iron.

When the can is leaving the iron 11, the point of contact between the can and the iron is at $b$ or a point at the right of a vertical line $y, y$, passing centrally through the can. While the can has been rotating in the direction of the arrow s therefore, the point of contact between the can and the iron has been traveling in the opposite direction, and therefore, the extent of contact on the end seam is greater than the actual travel of the can, while in contact with the iron.

Instead of using a U-shaped permanent magnet as herein shown, it is obvious that I may use any other form of magnet or magnetized member, the essential feature being that this member shall engage the upper face of the cans and cause sufficient drag thereon so as to compel the can to rotate in an opposite direction to the direction of rotation of the can in the travel of the can to the soldering mechanism.

As a matter of fact, this result of rotating the can in the opposite direction, might possibly be secured by any frictional drag, although I prefer to use a magnet as the can will then be bodily lifted from its supporting rail and will roll along the magnet as a supporting member.

Having thus particularly described my invention, what I claim as new and desire to cure by Letters Patent is:—

1. A soldering machine including in combination, a soldering iron located beneath the path of movement of the cans, means for continuously conveying the cans through the soldering machine, and means for rotating the cans while in contact with the soldering iron in a direction to cause a sliding contact between the can end and the soldering iron whereby a clean soldering contact is maintained on said soldering iron.

2. A soldering machine including in combination, soldering means located beneath the path of movement of the cans, means for conveying the cans through the soldering machine, and means for rotating the cans while in contact with the soldering means in a direction opposite to the direction of rotation of the cans in their bodily travel to the soldering means.

3. A soldering machine including in combination, soldering means located beneath the path of movement of the cans, means for conveying the cans through the soldering machine, and means for engaging the upper sides of the cans and rotating the same in a direction opposite to the direction of rotation of the cans in the bodily travel of said cans to the soldering means.

4. A soldering machine including in combination, soldering means located beneath the path of movement of the cans, means for conveying the cans through the soldering machine, and means located above the cans for raising and supporting the end of the can and causing the same to rotate in a direction opposite to the direction of rotation of the cans in their bodily movement to the soldering means.

5. A soldering machine including in combination a solder bath, a soldering iron, means for intermittently immersing said iron in said solder bath whereby it is charged with solder, means for conveying cans through the soldering machine, and means for rotating the cans in a direction opposite to the direction of the cans in their bodily movement to the soldering iron.

6. A soldering machine including in combination, a solder bath, a soldering iron located in said soldering bath, means for yieldingly holding the contacting face of said iron above the surface of the bath, means for intermittently immersing the iron in the bath, means for conveying the cans through the soldering machine, and means for rotating the cans in a direction opposite to the direction of rotation of the cans in their movement to the soldering iron.

7. A soldering machine including in combination, a solder bath, a plurality of pivotally supported soldering irons located in said bath, means for normally holding the contacting faces of said irons above the surface of said bath, means for intermittently immersing said irons in said bath, means for conveying cans through the soldering machine, and means for rotating the cans in a direction opposite to the direction of rotation of the cans in their movement to the soldering irons.

8. A soldering machine including in combination, a solder bath, a plurality of pivotally supported soldering irons located in said bath, means for normally holding the contacting faces of said irons above the surface of said bath, means for intermittently immersing said irons in said bath, means for conveying cans through the soldering machine, means located above the cans for supporting the same and causing the cans to rotate in a direction opposite to the direction of rotation of the cans in their movement to the soldering irons.

9. A soldering machine including in combination, soldering means located beneath the path of movement of the cans, means for conveying the cans through the soldering machine, and a magnet located above the cans whereby the cans will be lifted into contact with the magnet and caused to rotate in a direction opposite to the direction of rotation of the cans in the travel to the magnet.

10. A soldering machine including in combination, a solder bath, a soldering iron located in said solder bath, with the soldering face thereof normally above the surface of said bath, means for intermittently immersing the iron in said bath, means for conveying the cans through the soldering machine and a magnet located above the cans for supporting the same, and causing the cans to rotate in a direction opposite to the direction of rotation of the cans in the travel to the soldering iron.

11. A soldering machine including in combination, supporting rails, means for rolling the cans along said supporting rails, a magnet located above the supporting rails a distance greater than the diameter of the cans, and lying substantially parallel with the path of movement of said cans whereby the cans will be lifted from the supporting rails and caused to rotate in the opposite direction on said magnet, and means for applying solder to the end seams of the cans at the lower side thereof.

12. A soldering machine including in combination, supporting rails, means for rolling the cans along said supporting rails, a magnet located above the supporting rails, a distance greater than the diameter of the cans, and lying substantially parallel with the path of movement of said cans whereby the cans will be lifted from the supporting rails and caused to rotate in the opposite direction on said magnet, a soldering iron located beneath the cans, means for supplying said iron with solder and means for yieldingly holding said iron in contact with the end seams of the cans.

13. A soldering machine including in combination, supporting rails, means for rolling the cans along said supporting rails, a magnet located above the supporting rails, a distance greater than the diameter of the cans, and lying substantially parallel with the path of movement of said cans, whereby the cans will be lifted from the supporting rails and caused to rotate in the opposite direction on said magnet, a solder bath beneath said cans, a soldering iron located in said bath, means for intermittently immersing the iron in the bath, and means for yieldingly raising said iron into contact with the cans, while said cans are in engagement with said magnet.

In testimony whereof I affix my signature, in presence of two witnesses.

DANIEL P. ROBINSON.

Witnesses:
MARK A. ELLIOTT,
JOHN W. HEWES.